United States Patent [19]
Nielsen et al.

[11] Patent Number: 5,574,496
[45] Date of Patent: Nov. 12, 1996

[54] TECHNIQUES FOR MINIMIZING CO-CHANNEL INTERFERENCE IN A RECEIVED ATV SIGNAL

[75] Inventors: Larry E. Nielsen, Chicago; David A. Willming, Palatine, both of Ill.

[73] Assignee: Zenith Electronics Corporation, Glenview, Ill.

[21] Appl. No.: 474,049

[22] Filed: Jun. 7, 1995

[51] Int. Cl.$^6$ ............................................. H04N 5/38
[52] U.S. Cl. ................................................ 348/21; 348/470
[58] Field of Search ........................... 348/21, 469, 470, 348/726; 375/350; H04n 5/38

[56] References Cited

U.S. PATENT DOCUMENTS

| | | |
|---|---|---|
| 4,958,230 | 9/1990 | Jonnalagadda et al. ............... 348/27 |
| 5,087,975 | 2/1992 | Citta et al. ............................. 348/4 |
| 5,408,262 | 4/1995 | Kim et al. ............................. 348/21 |

Primary Examiner—Victor R. Kostak

[57] ABSTRACT

A technique for enhancing the robustness of an ATV transmission system in the presence of NTSC or ATV co-channel interference comprises positioning the ATV signal relative to the co-channel NTSC/ATV signal to reduce interference into the ATV receiver. In a preferred embodiment, the ATV signal is positioned relative to a co-channel NTSC signal such that the demodulated difference $f_v - f_p$ in the ATV receiver is equal to 70.5 $f_{seg}$, where $f_v$ is the NTSC visual carrier frequency, $f_p$ is the ATV pilot carrier frequency and $f_{seg}$ is the ATV segment repetition rate, and relative to a co-channel ATV signal such that their respective pilot frequencies differ by an amount equal to 1.5 $f_{seg}$.

10 Claims, 2 Drawing Sheets

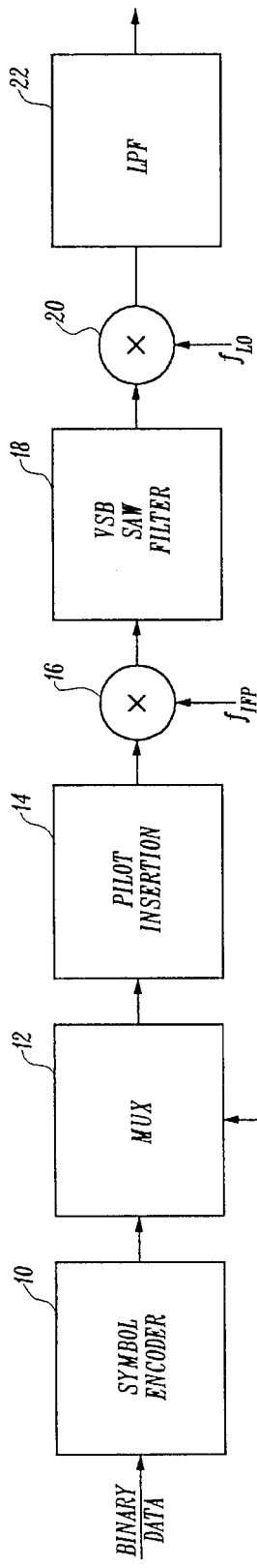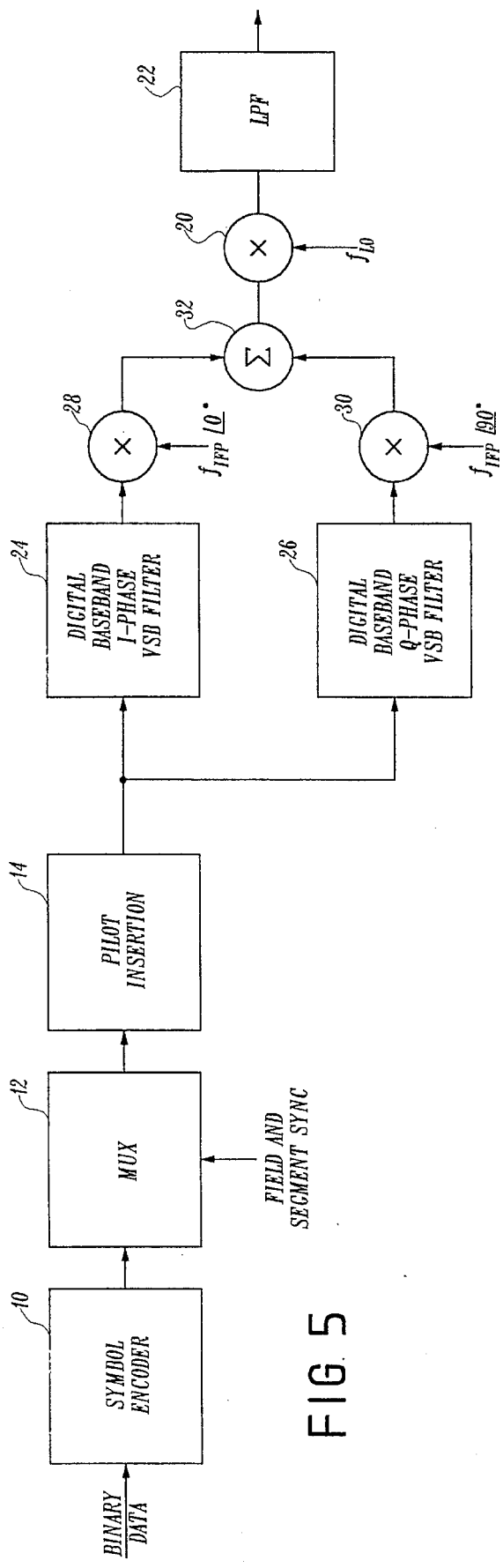

5,574,496

TECHNIQUES FOR MINIMIZING CO-CHANNEL INTERFERENCE IN A RECEIVED ATV SIGNAL

BACKGROUND OF THE INVENTION AND PRIOR ART

This invention relates generally to digital advanced television (ATV) transmission systems (i.e., digital high definition television (HDTV) and digital standard definition television, and particularly to ATV terrestrial transmission systems which are exposed to interference from ATV or NTSC signals operating on the same channel assignment. The ATV signal comprises a VSB (vestigial sideband) type transmission having data frames that are organized into repetitive data segments of 832 multilevel symbols each. Each data frame has a first data field sync segment followed by 312 data segments and a second data field sync segment followed by another 312 data segments. Each data segment consists of a four symbol segment sync followed by 828 data and forward error correction (FEC) symbols.

The ATV signal may be transmitted on current NTSC channels including so-called "taboo" or unusable NTSC channels. A high data rate cable mode supports two or more, depending upon their resolution, ATV signals in one 6 MHz channel, whereas a lower data rate, but more robust, terrestrial mode supports one or more, depending upon their resolution, ATV signals in one 6 MHz channel with minimum interference to or from NTSC signals.

The ATV system, when transmitting signals in the presence of NTSC co-channels, includes ATV receivers that are constructed and arranged to minimize the interference from the NTSC co-channels. In general, an NTSC rejection filter may be used in the ATV receiver for providing a high rejection rate at the NTSC signal visual, color and audio carriers. The transmitted ATV signal, which includes a small pilot coincident with a suppressed carrier near the lower edge of the channel in accordance with the invention, is positioned relative to the NTSC visual carrier to enhance the operation of the NTSC rejection filter in the case of NTSC co-channel signals and to minimize interference from a nearby co-channel ATV signal where that condition obtains.

OBJECTS OF THE INVENTION

A principal object of the invention is to provide an improved ATV signal transmission system.

Another object of the invention is to provide an ATV transmission system that is relatively immune to interference from NTSC co-channels or other ATV co-channels.

BRIEF DESCRIPTION OF THE DRAWINGS

These and other objects and advantages of the invention will be apparent upon reading the following description in conjunction with the drawings, in which:

FIG. 4 is a partial block diagram of an ATV transmitter according to the invention; and FIG. 5 is a partial block diagram of an alternate embodiment of an ATV transmitter according to the invention.

DESCRIPTION OF THE PREFERRED EMBODIMENT

The ATV signal described above has a constant symbol rate of 10.76 MHz. There are 832 symbols per segment, so that the segment rate is approximately 12.9 kilosegments per second. The suppressed carrier pilot is about 310 KHz from the lower band edge (in the vestigial side band region of a co-channel NTSC signal) and does not contribute to co-channel interference into the NTSC signal. The ATV receiver is equipped with an NTSC rejection comb filter that is placed in the signal path when operating in the presence of NTSC co-channel signals. In accordance with the invention, the ATV signal is positioned relative to the NTSC signal such that the frequency difference between the NTSC visual carrier and the ATV pilot is 69.5 or 70.5 times the segment frequency (fseg) with 70.5 (a difference of approximately 912 KHz) being preferred. This alignment is selected to best satisfy three conditions, as will be discussed.

Figure 1:
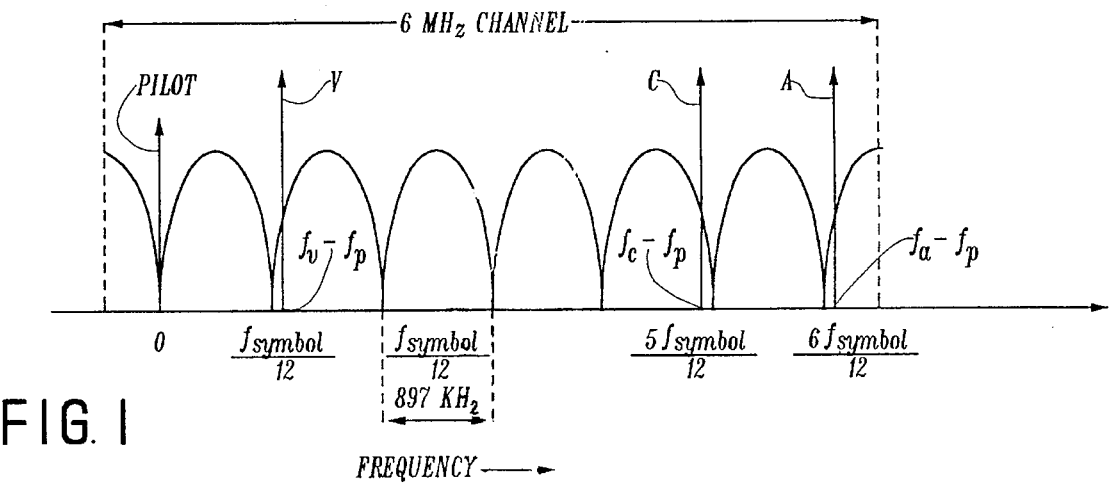
FIG. 1 depicts the frequency response of an NTSC rejection comb filter with respect to the pilot frequency of an ATV signal.

FIG. 1 indicates the frequency response curve of an NTSC rejection comb filter with a feed forward delay of 12 symbols. (See U.S. Pat. No. 5,087,975.) The ATV pilot frequency (fp) is seen to fall at the first notch of this filter response and the co-channel NTSC visual (V), chroma (C) and audio (A) carriers are seen to fall very close to the second, fifth and sixth notches, respectively, of the filter. The position of the NTSC spectral components V, C and A in the demodulated ATV baseband signal depends, of course, upon the relative alignment between the ATV and NTSC signals. When this alignment is properly chosen, the NTSC rejection filter in the ATV receiver produces nulls very near the visual, chroma and audio carrier frequencies of the NTSC co-channel signal which greatly minimizes the interfering effects of the NTSC co-channel signal into the ATV receiver. Thus, the first condition for the preferred positional relationship between the ATV and co-channel NTSC signals is that the two signals be aligned such that the visual, chroma and audio carriers of the NTSC signal coincide as closely as possible with the nulls of the notched filter response.

Figure 2:
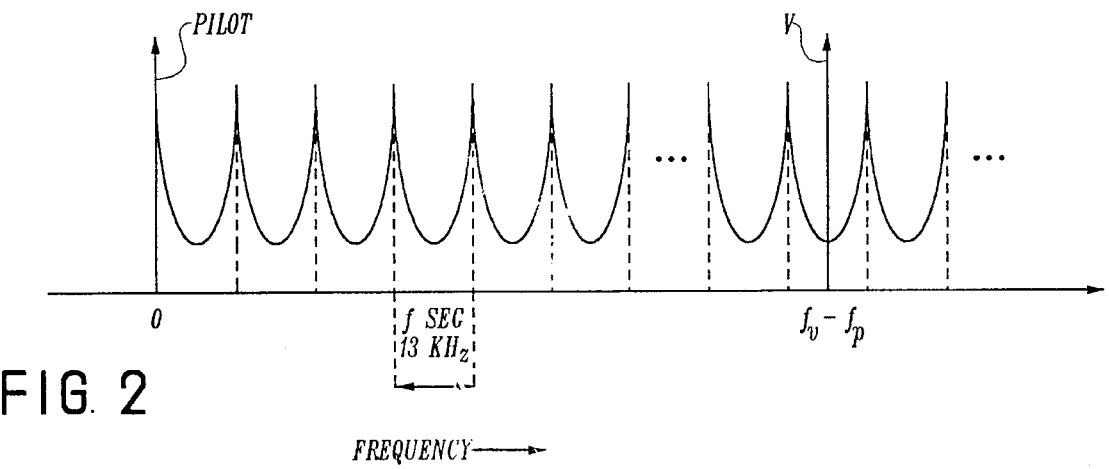
FIG. 2 represents the frequency response of a feedback comb filter in the clock recovery circuit of an ATV receiver with respect to the pilot frequency of the ATV signal.

In FIG. 2, the frequency response characteristic of a comb filter having a feedback delay of one segment (832 symbols) is shown. This feedback comb filter is used in the clock recovery circuit of an ATV receiver. To minimize interference with the clock recovery circuit, the NTSC co-channel visual carrier should coincide with a minimum of the filter response, as indicated by the position of V with respect to the response characteristic of FIG. 2. This condition is satisfied where $f_V - f_P = [(2K+1)/2] f_{seg}$; that is, where the difference between the NTSC visual carrier frequency $f_v$ and the ATV pilot frequency $f_p$ is equal to $(2K+1)/2$ times the segment frequency $f_{seg}$, where K is an integer. Hence, the second condition is that the difference between the NTSC visual carrier frequency $f_v$ and the ATV pilot frequency $f_p$ is an odd one-half multiple of the segment frequency $f_{seg}$.

Figure 3:
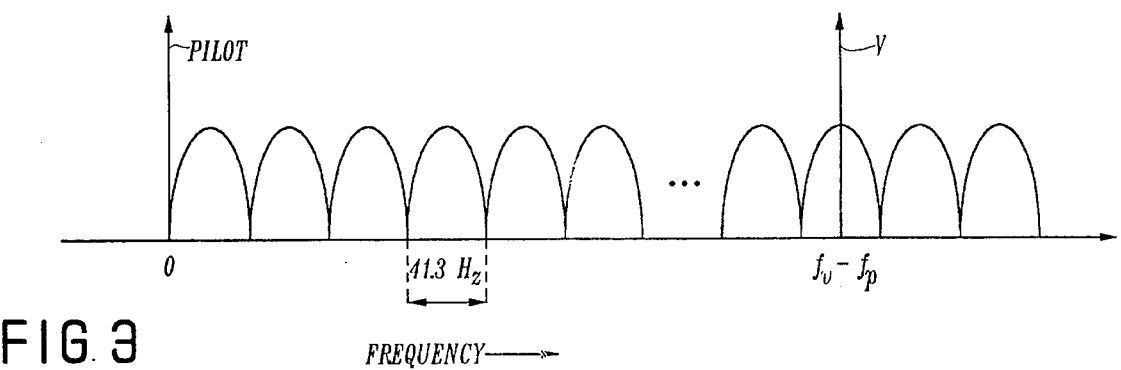
FIG. 3 represents the frequency response of a feed forward frame comb filter in an ATV receiver with respect to a co-channel NTSC visual carrier.

The third condition is represented in FIG. 3, which shows the frequency response of a frame comb with a feed forward delay of 313 segments. This type of filter may be used in the equalization circuit of the ATV receiver. In this case, it is desired that the visual carrier V fall on a maximum of the frame comb response as indicated by V coinciding with the maximum of a lobe of the frame comb response curve. In this case, therefore, it is desired that $f_v - f_p$ is an odd one-half multiple of the field frequency; that is, $f_v - f_p = [(2M+1)/2] f_{field}$, where M is an integer and $f_{field}=f_{symbol}/(832\times313)=f_{seg}/313=41.3$ HZ.

All three of the above conditions are satisfied by choosing $f_v-f_p$ equal to 69.5 $f_{seg}$ or 70.5 $f_{seg}$ with the latter being preferred for best overall performance based on empirical results. Referring back to FIG. 1, the frequency of the notches V, C and A with respect to the pilot are about 897 KHz $f_{symbol}/12$, 4.48 MHz ($5f_{symbol}/12$) and 5.38 MHz ($6f_{symbol}/12=f_{symbol}/2$), respectively. With $f_v-f_p$ equal to 70.5 $f_{seg}$, $f_v-f_p$ equals 912 KHz, $f_c-f_p$ equals 4.4 MHz and $f_a-f_p$ is equal to 5.41 MHz. It is seen that these values closely match the notch frequencies. Conditions 2 and 3 are also satisfied since $f_v-f_p=70.5$ $f_{seg}=70.5$ (313) $f_{field}=22066.5$ $f_{field}$ which is an odd half multiple of both the segment and the frame frequencies.

In the event that there is no NTSC interference, but rather another ATV co-channel, the two ATV co-channel signals are preferably aligned relative to each other such that their pilot signals differ in frequency by an odd one-half multiple of the segment and field frequencies with a value of 1.5 times the segment frequency providing optimum performance.

FIG. 4. is a block diagram of an embodiment of an ATV transmitter according to the invention. A binary data signal representing one or more compressed television signals is applied to a symbol encoder 10. Encoder 10, which may include a number of circuits to enhance the robustness of the ATV signal such as a trellis coded modulator, a Reed-Solomon encoder, a convolutional interleaver and a data randomizer, converts the input binary data to a digital multilevel (preferably 8-level) output signal for application to a multiplexer 12. Multiplexer 12 multiplexes the output of symbol encoder 10 with appropriate field and segment sync symbols to provide an output signal having the format previously described. This signal is supplied to a pilot insertion circuit 14 where the symbols are offset by a small DC value representing a pilot component. The output of pilot insertion circuit 14 is applied to a first converter 16 which also receives an intermediate frequency pilot carrier $f_{IFP}$ (e.g. 46.69 MHz). The output of converter 16 therefore comprises two identical double sideband signals centered about $f_{IFP}$ and $-f_{IFP}$. The output of converter 16 is applied to a vestigial sideband (VSB) SAW filter 18 which transforms each of the double sideband output signals from converter 16 to a respective vestigial sideband signal, which is then applied to an upconverter 20. Upconverter 20 also receives an upconversion carrier $f_{LO}$ which, when combined with the output of VSB filter 18, produces a plurality of VSB output signals which are filtered by LFP 22 to provide a VSB output signal for transmission at a channel frequency corresponding to the frequency of the upconversion carrier.

An alternate embodiment of the ATV transmitter of the invention is shown in FIG. 5. In this embodiment, the multilevel symbol signal from multiplexer 12 is applied to a pair of digital baseband VSB filters, an I-phase filter 24 and a Q-phase filter 26. The output of filter 24 is converted to an in-phase intermediate frequency signal by a first converter 28 in response to an in-phase component of $f_{IFP}$ and the output of filter 26 is converted to a quadrature phase intermediate frequency signal by a second converter 30 in response to a quadrature component of $f_{IFP}$. The outputs of converters 28 and 30 are then combined by a summer 32 to provide an output signal equivalent to the output produced by VSB SAW filter 18 of the embodiment of FIG. 4. The main advantage of the transmitter of FIG. 5 is that digital baseband VSB filters 24 and 26 can be adjusted to provide other effects, such as signal pre-equalization, while the VSB SAW filter of FIG. 4 has a fixed response characteristic.

In either case, however, the V frequencies of the IF pilot, $f_{XFP}$ and upconverter local oscillator $f_{LO}$ are selected such that the positional relationships between the ATV and co-channel NTSC/ATV signals described above are achieved.

What has been described is a novel ATV transmission system that minimizes interference from NTSC co-channels and ATV co-channels. It is recognized that numerous changes in the described embodiment of the invention will be apparent to those skilled in the art without departing from its true spirit and scope. The invention is to be limited only as defined in the claims.

What is claimed is:

1. A method of transmitting an ATV signal, comprising multilevel symbols formatted in repetitive segments and having a pilot, in the service area of a co-channel NTSC signal where an ATV receiver includes an NTSC rejection filter having a feed forward delay comprising:

selecting the positional relationship between the NTSC and ATV signals such that the demodulated difference $f_v-f_p$, where $f_v$ is the frequency of the NTSC visual carrier and $f_p$ is the frequency of the ATV pilot, is located close to a first notch of the NTSC rejection filter.

2. The method of claim 1 further comprising selecting said positional relation such that the demodulated differences $f_c-f_p$ and $f_a-f_p$, where $f_c$ is the NTSC chroma carrier and $f_a$ is the NTSC audio carrier, are located close to a second and a third notch, respectively, of the NTSC co-channel filter.

3. The method of claim 1 wherein the receiver includes a clock recovery circuit having a feedback filter with a one segment delay and further comprising;

selecting said positional relationship such that the demodulated difference $f_v-f_p$ satisfies the following relationship:

$f_v-f_p=[(2K+1)/2]f_{seg}$, where $f_{seg}$ is the ATV segment frequency and K is a selected integer.

4. The method of claim 1 wherein the ATV receiver includes a feed forward field comb and where said positional relationship is selected such that the demodulated difference $f_v-f_p$ satisfies the relationship $f_v-f_p=[(2M+1)/2]f_{field}$, where $f_{field}$ is the field frequency of the ATV signal and M is a selected integer.

5. The method of claim 1 wherein the demodulated difference $f_v-f_p$ is 69.5 or 70.5 times the segment frequency of the ATV signal.

6. The method of transmitting an ATV signal comprising multilevel symbols in repetitive segments and including a pilot, in the presence of another co-channel ATV signal of similar characteristics comprising:

aligning the two ATV co-channel signals such that their pilot frequencies differ by an amount equal to an odd one-half multiple of the field frequency and an odd one-half multiple of the segment frequency.

7. The method of claim 6 wherein the difference is equal to one and one-half times the segment frequency.

8. A method of transmitting an ATV signal, comprising multilevel symbols formatted in repetitive segments and having a pilot, in the service area of a co-channel NTSC signal where an ATV receiver includes an NTSC rejection filter having a feed forward delay comprising:

aligning the NTSC and ATV signals such that the ATV receiver produces a demodulated difference $f_v - f_p$ is located adjacent to a first notch of the NTSC rejection filter and further satisfies the relationships:

$$f_v - f_p = [(2K+1)/2] f_{seg}$$

and $$f_v - f_p = [(2M+1)/2] f_{field} \qquad (1)$$

where $f_v$ is the NTSC visual carrier frequency, $f_p$ is the ATV pilot frequency, $f_{seg}$ is the ATV segment frequency, $f_{field}$ is the ATV field frequency and K and M are selected integers.

9. The method of claim 8 where the demodulated difference $f_v - f_p$ is 70.5 $f_{seg}$.

10. The method of transmitting an ATV signal comprising multilevel symbols in repetitive segments and including a pilot, in the presence of another co-channel ATV signal of similar characteristics comprising:

aligning the two ATV co-channel signals such that their pilot frequencies differ by an amount equal to one and one-half times their segment frequencies.

* * * * *

UNITED STATES PATENT AND TRADEMARK OFFICE
CERTIFICATE OF CORRECTION

PATENT NO. : 5,574,496

DATED : November 12, 1996

INVENTOR(S) : Larry E. Nielsen and David A. Willming

It is certified that error appears in the above-identified patent and that said Letters Patent is hereby corrected as shown below:

Column 4,
In Claim 1, Line 10, cancel "close" and substitute therefor -- adjacent --;
In Claim 2, Line 4, cancel "close" and substitute therefor -- adjacent --;

Signed and Sealed this

Fourth Day of February, 1997

Attest:

BRUCE LEHMAN

*Attesting Officer*    *Commissioner of Patents and Trademarks*